US006434688B1

(12) United States Patent
Rhoden et al.

(10) Patent No.: US 6,434,688 B1
(45) Date of Patent: Aug. 13, 2002

(54) METHOD AND APPARATUS FOR PROVIDING AND MAXIMIZING CONCURRENT OPERATIONS IN A SHARED MEMORY SYSTEM WHICH INCLUDES DISPLAY MEMORY

(75) Inventors: William Desi Rhoden; Rajeev Jayavant, both of Phoenix, AZ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 08/530,617

(22) Filed: Sep. 20, 1995

Related U.S. Application Data

(63) Continuation of application No. 08/159,224, filed on Nov. 30, 1993, now abandoned.

(51) Int. Cl.[7] .............................................. G06F 15/00
(52) U.S. Cl. ......................... 712/34; 345/503; 345/532
(58) Field of Search .............................. 395/820, 162, 395/474, 800.01, 480, 497.04; 712/34; 345/503, 532

(56) References Cited

U.S. PATENT DOCUMENTS

| | | | |
|---|---|---|---|
| 4,601,018 A | | 7/1986 | Baum et al. ................. 365/189 |
| 4,926,322 A | | 5/1990 | Stimac et al. ............... 395/500 |
| 4,953,101 A | * | 8/1990 | Kelleher et al. ............ 364/518 |
| 4,980,828 A | * | 12/1990 | Kapcio et al. .......... 364/413.13 |
| 5,088,033 A | * | 2/1992 | Binkley et al. ............. 395/500 |
| 5,329,630 A | * | 7/1994 | Baldwin ...................... 395/425 |
| 5,450,542 A | | 9/1995 | Lehman et al. ............. 395/162 |
| 5,454,107 A | | 9/1995 | Lehman et al. ............. 395/480 |

FOREIGN PATENT DOCUMENTS

| | | |
|---|---|---|
| GB | 2 019 059 | 10/1979 |
| JP | 62089151 | 4/1987 |

OTHER PUBLICATIONS

Chips and Technologies, Inc., Revision 0.6, Jul. 1992, 64200 (Wingine™) High Performance Windows™ Engine, pp. 5–11 and 96–96.

* cited by examiner

*Primary Examiner*—John A. Follansbee
(74) *Attorney, Agent, or Firm*—Peter Zawilski

(57) ABSTRACT

The present invention provides a low-cost computer system which includes a single sharable block of memory that can be independently accessible as graphics memory or main store system memory without performance degradation. Because the "appetite" for main system memory (unlike that of a display memory) is difficult to satisfy, the memory can be addressed by reallocating an unused portion of a display memory for system memory use. Reallocation of the unused display memory alleviates any need to oversize the display memory, yet realizes the cost effectiveness of using readily available memory sizes. Further, reallocation of the graphics memory avoids any need to separately consider both the system memory and the display memory in accommodating worst case operational requirements. In accordance with additional embodiments, improved efficiency of operation can be achieved to enhance concurrency between plural banks of memory when expansion memory is included. The addressable locations of the expansion memory can be mapped to the bottom of the available system address space, and addressable locations of any prior base system memory are moved above the expansion memory space.

15 Claims, 5 Drawing Sheets

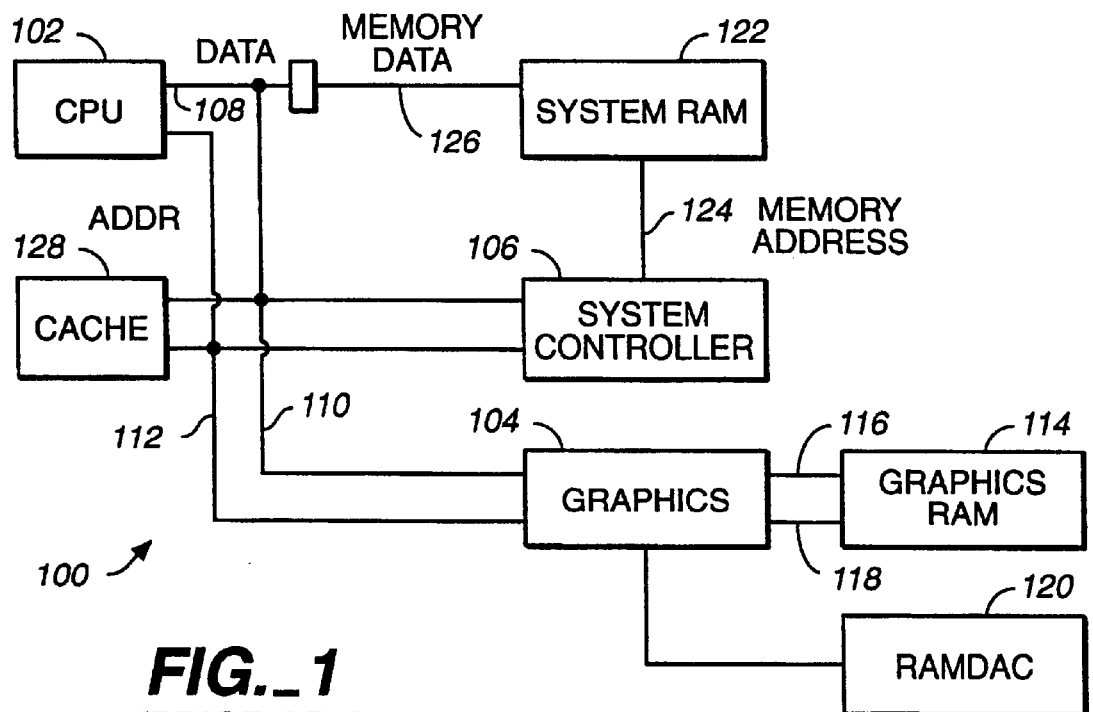
FIG._1
*(PRIOR ART)*
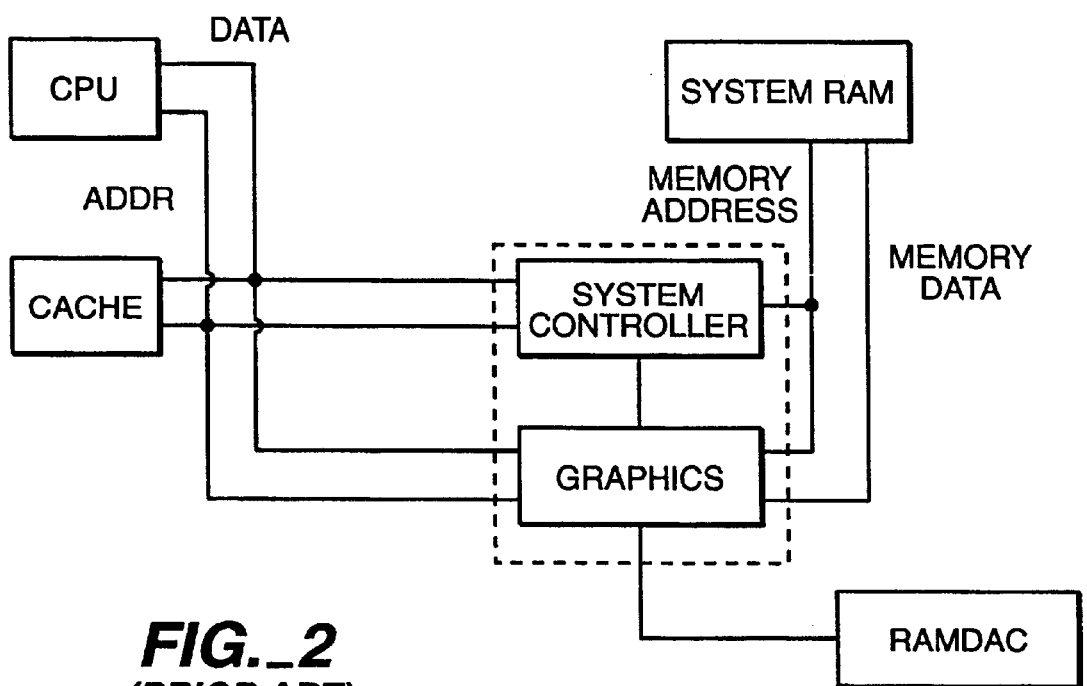
FIG._2
*(PRIOR ART)*

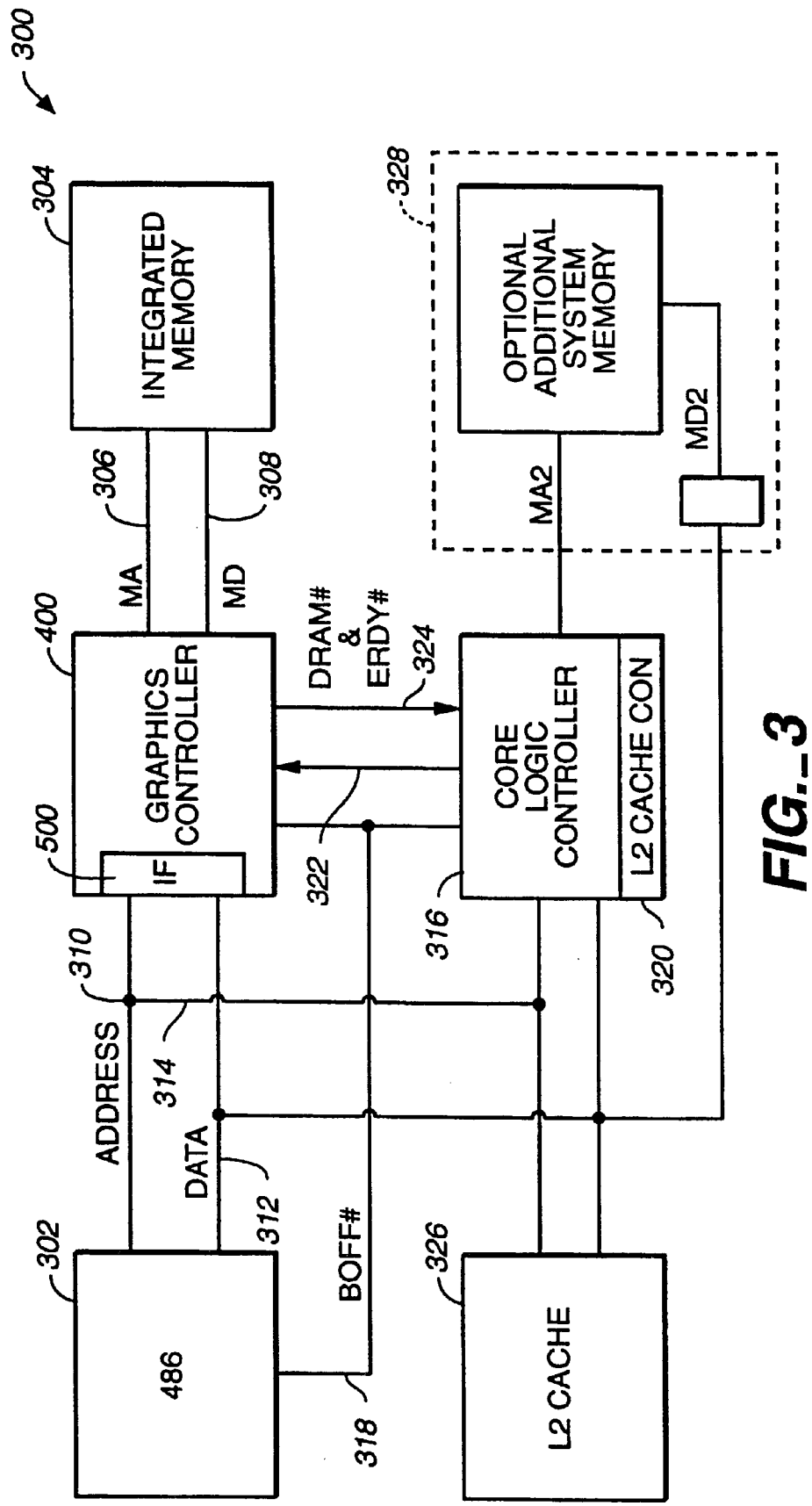
FIG._3

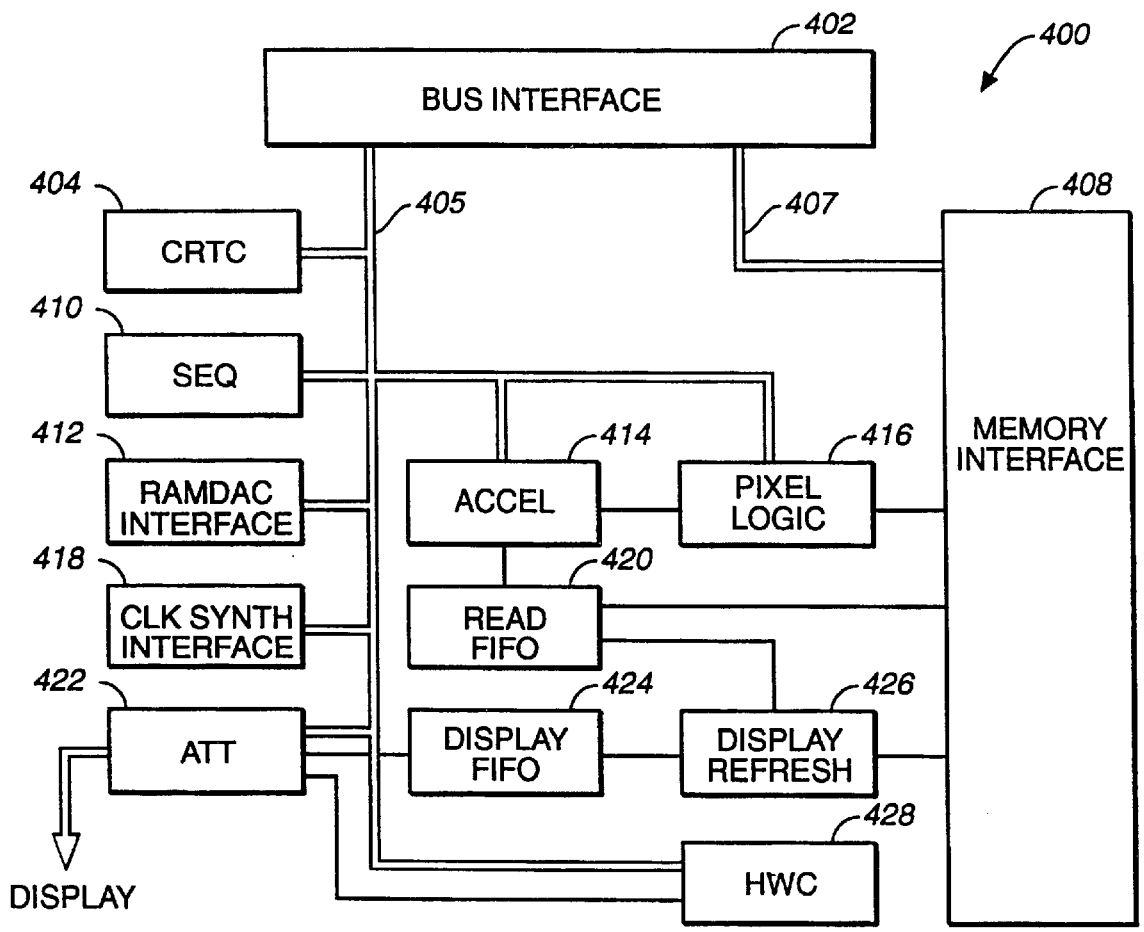
FIG._4
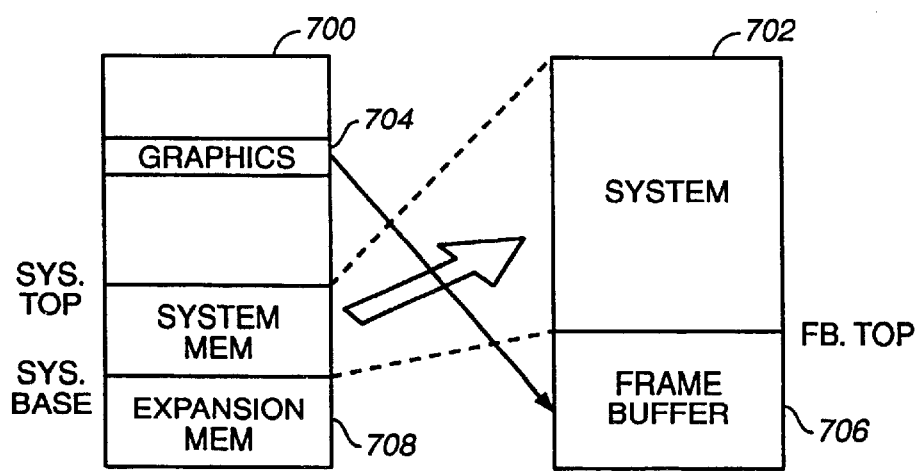
FIG._7

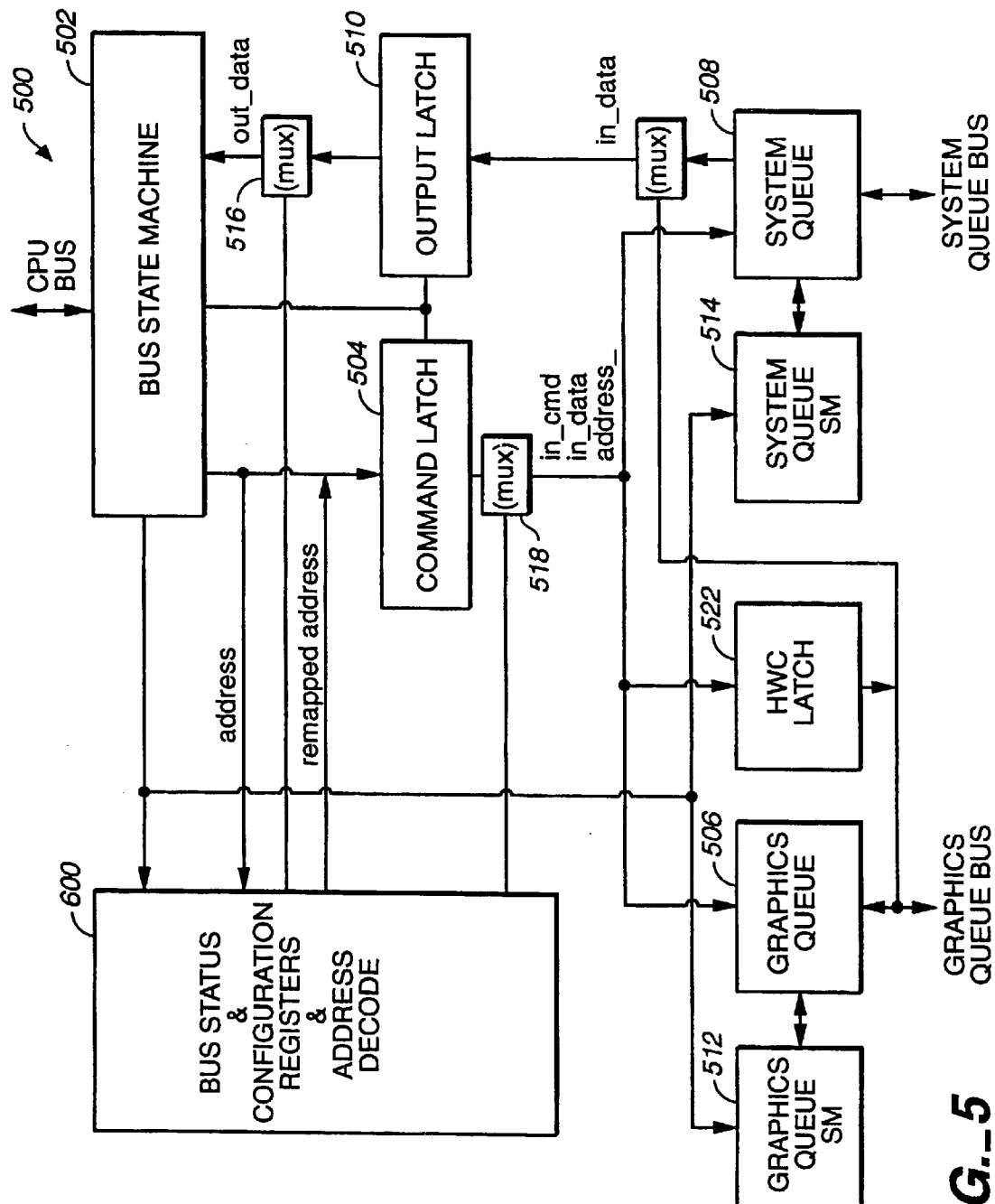
FIG._5

METHOD AND APPARATUS FOR PROVIDING AND MAXIMIZING CONCURRENT OPERATIONS IN A SHARED MEMORY SYSTEM WHICH INCLUDES DISPLAY MEMORY

This application is a continuation of application Ser. No. 08/159,224, filed Nov. 30, 1993 now abandoned.

BACKGROUND OF THE INVENTION

1. Field of the Invention

The present invention relates generally to computer architecture, and more particularly, to memory-sharing architectures which include graphics capabilities.

2. State of the Art

As the density of solid state memories increases, oversized memories are being wastefully used for purposes which optimally require specialized memory configurations (e.g., a graphics refresh). One reason for this is that manufacturers attempt to produce memory sizes which will achieve a broad range of applicability and a high volume of production. The more popular, and thus more cost-effective memories, tend to be fabricated with square aspect ratios or with tall, thin aspect ratios (i.e., a large number of fixed length words) that are not readily suited to specialized uses.

Although uses which can exploit memories with these popular aspect ratios can be implemented in a relatively cost-effective manner, specialized uses which cannot exploit these aspect ratios can be proportionately more expensive to implement. The expense associated with implementing specialized uses assumes one of two forms: (1) the increased cost associated with purchasing a memory which does not conform to a readily available and widely used memory configuration; or (2) the increased cost associated with purchasing a readily available memory which is much larger than needed to implement a specialized use (e.g., a relatively square memory which must be tall enough to obtain a desired width, even though only a relatively small number of rows in the memory are needed for the purpose at hand).

The foregoing memory capacity problem is typically referred to as the memory granularity problem: expensive chips can be purchased and used efficiently or inexpensive memory chips can be purchased and used inefficiently. This problem is especially significant in computer systems which implement graphics functions, since these systems typically include a dedicated, high speed display memory. Specialized display memories are usually required because typically refresh for the graphics display (e.g., for a 1280×1024 display) consumes virtually all of the available bandwidth of a typical dynamic random access memory (DRAM).

To update a video line on a high resolution graphics display, a graphics refresh optimally requires a memory having a short, wide aspect ratio. Display memories used as frame buffers for high resolution graphics displays have therefore become an increasingly larger fraction of a system's overall cost due to the foregoing memory problem. For display memories, even a two megabyte memory can be unnecessarily large, such that it cannot be effectively used. An exemplary display memory for a current high-end display of 1280×1024 pixels requires just over one megabyte of memory. Thus, almost one-half of the display memory remains unused.

For example, FIG. 1 illustrates a typical computer system 100 which includes graphics capabilities. The FIG. 1 computer system includes a central processing unit (CPU) 102, a graphics controller 104 and a system controller 106 all connected to a common bus 108 having a data portion 110 and an address portion 112.

The graphics controller 104 is connected to display memory 114 (e.g., random access memory, or RAM) by a memory bus having a memory address bus 116 and a memory data bus 118. A random access memory digital-to-analog converter (RAMDAC) 120 provides signals (e.g., analog RGB color signals) used to drive a graphics display.

The system controller is connected to system memory 122 by a separate memory address bus 124. A memory data bus 126 is connected directly between the common data bus 108 and the system memory. The system memory can also include a separate cache memory 128 connected to the common bus to provide a relatively high-speed portion for the system memory.

The graphics controller 104 mediates access of the CPU 102 to the display memory 114. For system memory transfers not involving direct memory access (DMA), the system controller 106 mediates access of the CPU 102 to system memory 122, and can include a cache controller for mediating CPU access to the cache memory 128.

However, the FIG. 1 configuration suffers significant drawbacks, including the granularity problem discussed above. The display memory 114 is limited to use in connection with the graphics controller and cannot be used for general system needs. Further, because separate memories are used for the main system and for the graphics memory, a higher number of pin counts render integration of the FIG. 1 computer system difficult. The use of separate controllers and memories for the main system and the graphics also results in significant duplication of bus interfaces, memory control and so forth, thus leading to increased cost. For example, the maximum memory required to handle worst case requirements for each of the system memory and the graphics memory must be separately satisfied, even though the computer system will likely never run an application that would require the maximum amount of graphics memory and main store memory simultaneously. In addition, transfers between the main memory and the graphics require that either the CPU or a DMA controller intervene, thus blocking use of the system bus.

Attempts have been made to alleviate the foregoing drawbacks of the FIG. 1 system by integrating system memory with display memory. However, these attempts have reduced duplication of control features at the expense of system performance. These attempts have not adequately addressed the granularity problem.

Some attempts have been made, particularly in the area of portable and laptop systems, to unify display memory and system memory. For example, one approach to integrated display memory and system memory is illustrated in FIG. 2. However, approaches such as that illustrated in FIG. 2 suffer significant drawbacks. For example, refreshing of the display via the graphics controller requires that cycles be stolen from the main memory, rendering performance unpredictable. Further, these approaches use a time-sliced arbitration mode for allocating specific time slots among the system controller and the graphics controller, such that overall system performance is further degraded.

In other words, overall performance of the FIG. 2 system is limited by the bandwidth of the single memory block, and the high demands of graphics refresh function alone introduce significant performance degradation. The allocation of memory bandwidth between display access and system access using fixed time-slots only adds to performance degradation. Because the time slots must be capable of handling the worst case requirements for each of the system memory and display memory subsystems, the worst possible memory allocation is forced to be the normal case.

Examples of computers using time-slice access to an integrated memory are the Commodore and the Amiga. The Apple II computer also used a single memory for system and display purposes. In addition, the recently-released Polar™ chip set of the present assignee, for portable and laptop systems, makes provision for integrated memory.

A different approach is described in a document entitled "64200 (Wingine™) High Performance 'Windows™ Engine'", available from Chips and Technologies, Inc. In one respect, Wingine is similar to the conventional computer architecture of FIG. 1 but with the addition of a separate path that enables the system controller to perform write operations to graphics memory. The graphics controller, meanwhile, performs screen refresh only. In another respect, Wingine may be viewed as a variation on previous integrated-memory architectures. Part of system memory is replaced with VRAM, thereby eliminating the bandwidth contention problem using a more expensive memory (VRAM is typically at least twice as expensive as DRAM). In the Wingine implementation, VRAM is not shared but is dedicated for use as graphics memory. Similarly, one version of an Alpha microprocessor available from Digital Equipment Corporation is believed to include on board a memory controller that allows VRAM to be used to alleviate the bandwidth contention problem. The CPU performs a role analogous to that of a graphics controller, viewing the VRAM frame buffer as a special section of system RAM. As with Wingine, the VRAM is not shared.

Thus, traditional computer architectures, even those with integrated memories, cannot efficiently share a single memory to accommodate the two different functions of display memory and system memory without significantly degrading system performance. What is needed, then, is a new computer architecture that allows display memory and system memory to be shared while still achieving high system performance. Such an architecture should, desirably, allow for memory expansion and use with cache memory. Further, any such system should provide an upgrade path to existing and planned high performance memory chips, including VRAM, synchronous DRAM (SDRAM) and extended data out DRAM (EDODRAM).

SUMMARY OF THE INVENTION

The present invention provides a low-cost computer system which includes a single shared memory that can be independently accessible as graphics memory or main store system memory without performance degradation. Because the "appetite" for main system memory (unlike that of a display memory) is difficult to satisfy, the memory granularity problem can be addressed by programmably reallocating an unused portion of a display memory for system memory use. Reallocation of the unused display memory alleviates any need to oversize the display memory, yet realizes the cost effectiveness of using readily available memory sizes. Further, reallocation of the graphics memory avoids any need to separately consider both the system memory and the display memory in accommodating worst case operational requirements.

In exemplary embodiments, performance penalties can be minimized by dynamically allocating the memory bandwidth between concurrent graphics and system memory operations on demand, thereby avoiding use of fixed time slices. By eliminating use of fixed time slices to arbitrate between display memory and system memory accesses, graphics refresh functions can be accommodated with little or no effect on system memory demands. Exemplary embodiments achieve concurrent graphics and system operations by using a memory controller for controlling access to the shared memory, and an arbiter for arbitrating among requests for access to the memory.

In accordance with exemplary embodiments, configuration registers can programmably configure the concurrently accessed memory such that a first portion of the memory is allocated as display memory and a second portion of the memory is allocated as main memory. Control circuitry connected to the configuration registers and responsive to one or more signals applied to the apparatus, including address, data and control signals, can be used to direct at least some of the data signals to only one or the other of first and second data paths. A first data path is connected to the arbiter and includes a first buffer store for facilitating exchange of data with the shared memory, and a second data path is connected to the arbiter and includes a second buffer store for facilitating exchange of data with the shared memory.

In accordance with further embodiments, separate buffer stores, or queues, can be provided to enhance graphics and system accesses achieving improved latency times for both graphics and system cycles. The queues are serviced in parallel and independently of each other.

In accordance with yet additional embodiments of the present invention, improved efficiency of operation can be achieved to enhance concurrency between plural banks of memory when expansion memory is included in a system. As expansion memory is added, it can be mapped to the bottom of the available system address space, and any addressable locations of prior base system memory included in the shared memory are moved above the expansion memory space. Thus, a system controller will use addressable locations of the expansion memory first, and use the base system memory only when the expansion memory is full.

BRIEF DESCRIPTION OF THE DRAWINGS

The present invention can be further understood with reference to the following description and the appended drawings, wherein like elements are provided with the same reference numerals. In the drawings:

FIG. 1 is a system block diagram of a conventional computer system;

FIG. 2 is a block diagram of another conventional computer system;

FIG. 3 is a system block diagram of a base computer system in accordance with an exemplary embodiment of the present invention;

FIG. 4 is a more detailed block diagram of the graphics controller of FIG. 3;

FIG. 5 is a more detailed block diagram of the bus interface of FIG. 3;

FIG. 7 is a block diagram illustrating a remapping of memory in accordance with an exemplary embodiment of the present invention.

DETAILED DESCRIPTION OF THE PREFERRED EMBODIMENTS

Figure 6:
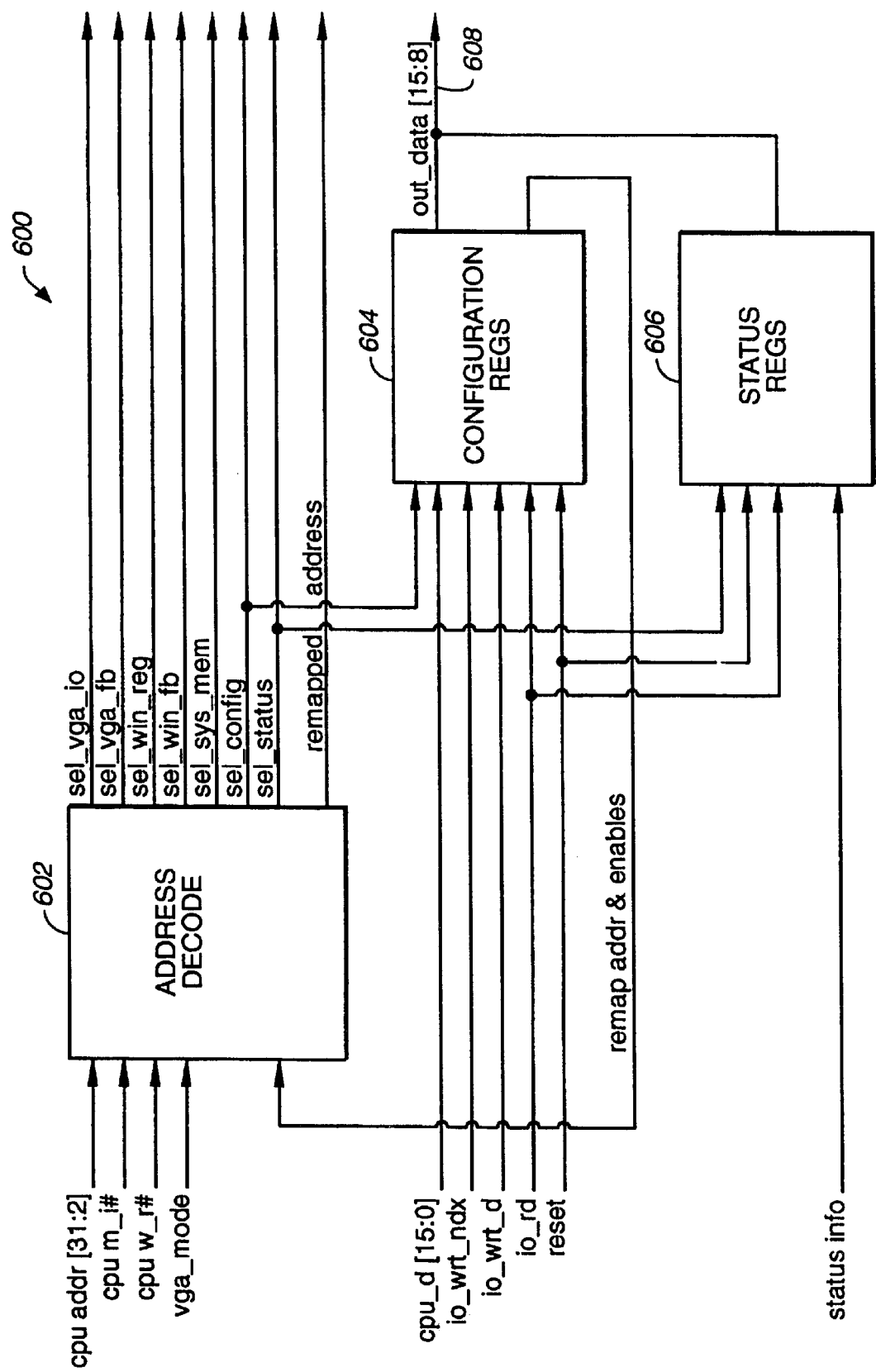
FIG. 6 is a more detailed diagram of the bus status and configuration registers and decode block of FIG. 5.

FIG. 3 illustrates an exemplary embodiment of an apparatus for processing data in accordance with the present invention. The FIG. 3 apparatus, generally labeled 300, can be a computer system which includes a main CPU 302. The main CPU 302 can, for example, be any available microprocessor, such as any standard 486-based processor.

The FIG. 3 apparatus includes a means for storing data, generally represented as a memory 304. In accordance with the present invention, the data storing means 304 includes a first range of addressable locations allocated to a system memory portion (e.g., random access memory, or RAM) and a second range of addressable locations allocated to a display memory portion (e.g., RAM) addressed via common address lines 306 labeled MA. The display (e.g., graphics) memory portion can include an address space from an addressable location 0 to an addressable location (B-1) for a data storing means having B bytes. Further, the display memory portion and the system memory portion read and write data via common memory data lines 308 labeled MD.

The FIG. 3 apparatus includes means for controlling a display operation of the FIG. 3 system independently of the system controller. The display controlling means is generally represented as a display (e.g., graphics) controller 400. The graphics controller 400 is connected to the CPU 302 via CPU address lines 310 and CPU data lines 312 of a main CPU bus 314. The graphics controller 400 controls access to the graphics memory portion of the data storing means.

The FIG. 3 computer system further includes means for controlling access to the system memory portion of the data storing means 304. The means for controlling access to the system memory portion is generally represented as a system controller 316 which is interfaced to the CPU 302 and the graphics controller 400 via the main CPU bus 314. The system controller can be integrated, in exemplary embodiments, in the main CPU. For example, although the graphics controller and the system controller are indicated as separate blocks, in a physical implementation, they can reside on a single integrated circuit chip or on separate chips.

The signal lines 318, 322 and 324 permit the FIG. 3 computer system to provide cache support for the system memory via the graphics controller 400, where the cache controller is included within the system controller. In accordance with exemplary embodiments, a cache memory 326 can be included for this purpose. Memory reads and writes can be performed to the data storing means in both burst and non-burst modes.

Generally speaking, the signal line 322 labeled DRAM# indicates to the graphics controller when an addressable location exists within the graphics memory and the addressable location is not in a level two (L2) cache 326 of the exemplary FIG. 3 embodiment. The signal line 324 labeled ERDY# is an early ready signal from the graphics controller to the system controller to verify that valid data has been read from the shared memory and will be valid for reading by the CPU in a predetermined time.

More particularly, typical personal computer systems feature an on-chip level-one (L1) cache of, for example, 8 kilo bytes within the CPU. Any external cache therefore functions as a level-two (L2) cache; i.e., data sought by the CPU is first sought in the L1 cache, then sought in the L2 cache, if necessary, and then sought in system memory if the data has not been found. In the conventional computer architecture of FIG. 1, since system memory is located in a single system memory 122, a cache controller included within the system controller 106 can function independently of the graphics controller 104.

In the system of FIG. 3, on the other hand, system memory is located in the shared data storing means 304. However, in accordance with exemplary embodiments, existing cache control capabilities of the system controller 316 can still be used by establishing communication between the graphics controller 400 and the system controller 316. Further, in the system of FIG. 3, system memory is located in both the data storing means represented by memory 304, and an optional expansion memory 328. A failure to detect data in the L2 cache may therefore result in the data being found in the shared memory or in expansion memory. Again, communication between the graphics controller 400 and the system controller 316 can handle this situation.

FIG. 3 illustrates the manner in which efficient L2 cache memory support is provided for a system wherein a system controller 316 has an integrated L2 cache controller, a graphics controller 400 and a shared memory. L2 cache support is provided for all system memory, regardless of the controller to which it is connected. Such support requires coordination between the system controller (with its integrated L2 cache controller) and the graphics controller.

In a 486-like or VL-Bus-based personal computer, L2 cache support may be provided using the existing backoff (i.e., BOFF#) CPU bus signal and the two new signals referred to herein as the DRAM# and ERDY# signals. DRAM# is driven by the system controller and ERDY# is driven by the graphics controller.

The system controller 316 monitors memory cycles and notifies the graphics controller when to ignore a particular memory cycle by deasserting the DRAM# on the signal line 322 at a predetermined time in the memory cycle. A system controller instructs the graphics controller to ignore a particular memory cycle when the addressable location is to a location other than the graphics portion of the data storing means (e.g., if the addressable location is to an ISA or PCI bus of the system, or if it's a location within the cache, or in another separate memory and so forth).

The graphics controller 400 also monitors memory cycles and begins a memory cycle when an addressable location is within the range of addressable locations for which the graphics controller is enabled to respond. In operation, the graphics controller tests the DRAM# on the signal line 322 at a predetermined time to determine whether it should respond to a current memory cycle. If the DRAM# signal on the signal line 322 has been deasserted by the system controller (i.e., false) the graphics controller 400 aborts the current memory cycle.

On the contrary, if the DRAM# on the signal line 322 has been asserted by the system controller (i.e., tests true), the memory cycle continues and the graphics controller 400 asserts the signal ERDY# on the signal line 324 to indicate to the system controller that the graphics controller is ready to read data. In this sense, the ERDY# signal represents an early ready signal which occurs a fixed number of clock cycles before data which is to be read becomes valid. In this instance, the cache controller 320 integrated within the system controller 316 senses the ERDY# signal on signal line 322 and initiates a writing of data into the cache 326.

The graphics controller can also be programmed to drive ERDY# at the end of a memory read cycle to signal to the system controller if a parity error occurred during the read.

Write-backs, for read-miss-dirty cycles and the like, are also supported using the BOFF# CPU bus signal. When write-back is required in response to a read request, the system controller asserts BOFF# (backoff), causing the CPU to abort the read cycle. Meanwhile, the graphics controller will have already started a memory read if the real address was within its address space.

The graphics controller also monitors BOFF# and, when it is asserted, is alerted that the read has been aborted. If the write-back is to memory outside the graphics controller's address space, the graphics controller may allow the read to continue, assuming that by the time the read has completed, the write-back may also be done, reducing latency time. The write-back may also be to memory in the graphics controller's address space. In this case, the system controller keeps BOFF# asserted and "masters" the write-back on the CPU bus by driving the bus just as the CPU would do if it were initiating the write. After the write-back has been completed, BOFF# is deasserted, and the CPU restarts the read operation.

This approach can be extended to provide L2 cache support for memory on other devices connected to the CPU bus. ERDY# may be driven by multiple sources in a "open-drain" configuration. Multiple DRAM# lines can be used or encoded together to signal to multiple devices.

In accordance with exemplary embodiments, the graphics controller 400 can include means for reallocating (e.g., programmably reallocating) addressable locations of the data storing means 304 as display memory which is accessible by the graphics controller 400, or as system memory which is independently accessible by the system controller 316. Further, the exemplary graphics controller 400 can include means for dynamically controlling access of the system controller and the display controlling means to the display memory portion and the system memory portion, respectively. The reallocating means and access controlling means are generally represented as block 500, included within the graphics controller 400.

The FIG. 3 computer system can provide significant advantages. For example, the FIG. 3 system represents a scalable architecture which can be configured for various price/performance alternatives. The FIG. 3 system represents a relatively low-cost system which includes a single bank of shared memory (represented by the data storing means 304) which can be concurrently used, and dynamically reconfigured for both graphics and system functions. Unlike previous integrated memory systems, the allocation of memory bandwidth between display access and system access is not fixed; rather, memory bandwidth is dynamically allocated on demand between display access and system access.

Exemplary embodiments of the present invention, such as that illustrated in FIG. 3, can include a second bank of memory represented by the expansion memory means 328. In accordance with the exemplary embodiment wherein expansion memory is used, B bytes of memory in the shared memory can be allocated to system use (i.e., base system memory), with an address space from address locations zero through address (B-1). The expansion memory can be considered to contain E bytes of expansion system memory (e.g., RAM). In an exemplary embodiment, the E bytes can be addressed beginning with starting address B and ending with address (E+B-1). In such an alternate embodiment, the data storing means 304 can continue to be shared between the graphics controller and the system controller.

In accordance with alternate embodiments, a relatively high level of performance can be achieved by dedicating all of the data storing means 304 to graphics, reserving only the relatively fast portion of the data storing means 304 or the expansion memory means for system use. With the add on of expansion memory via an independent, separately controlled memory bus, system performance can be further enhanced, while using the same cache controller integrated in the system controller. With the addition of a simple memory interface block, concurrent accesses can occur to both the data storing means 304 and the expansion memory means 328. For example, the possibility of parallel main memory accesses to two possible memory paths can result in increased performance by effectively overlapping accesses.

Thus, exemplary embodiments of the present invention provide significant advantages. By providing a single sharable block of memory that is independently accessible as graphics memory or as main store memory, improved performance at relatively low-cost can be realized. By rendering allocation of the shared memory programmable, any need to have maximum memory size for each of the independent graphics and main memory functions can be eliminated. Further, memory bandwidth can be dynamically allocated on demand rather than via fixed time slices, further improving performance.

Referring to FIG. 4, the graphics controller 400 interfaces to the CPU bus 314 via the reallocating means represented as bus interface 402. The graphics controller interfaces to the data storing means 304 via the access controlling means, represented as a memory interface 408.

Commands and data from the FIG. 3 CPU 302 are distributed to various logic blocks of the graphics controller 400 on two main buses represented by a display access bus 405 and a system access bus 407, indicated by thick, heavy lines in FIG. 4. The system access bus 407 is connected to the memory interface 408.

The display access bus 405 is connected to various graphics controller logic blocks which are responsive to commands or programming instructions from the CPU. These logic blocks include a CRT controller (CRTC) 404, a sequencer (SEQ) 410, a RAMDAC interface 412, a clock synthesizer interface 418, an attribute controller (ATT) 422, a hardware cursor (HWC) 428, a graphics accelerator (Accel) 414 and pixel logic 416. The foregoing logic blocks are by way of example only. Those skilled in the art will appreciate that any or all of these logic blocks can be used, as can any other desired logic blocks.

The CTRC 404 provides vertical and horizontal sync signals to a raster-scan CRT display. The sequencer 410 provides basic timing control for the CRTC 404 and the attribute controller 422. The RAMDAC interface 412 provides for programming of a RAMDAC (i.e., external or integrated) represented by the RAMDAC of FIG. 1. The RAMDAC is a combination random access memory and digital-to-analog converter that functions as a color palette which drives the CRT. The RAMDAC 120 in FIG. 1 can be a look-up table used to convert the data associated with a pixel in the display memory into a color (e.g., RGB analog output).

The attribute controller 422 provides processing for alphanumeric and graphics modes. The hardware cursor 428 provides for display of any of a number of user-definable cursors. The accelerator 414 and the pixel logic 416 assist the host CPU in graphics-related operations. The pixel logic 416 of FIG. 4 can also function as a pixel cache.

The clock synthesizer interface 418 provides for programming of a programmable clock synthesizer (i.e., external or integrated). Operation of the clock synthesizer interface, along with the other various graphics logic blocks in FIG. 3, is wellknown to one of ordinary skill in the art.

The memory interface 408, which functions as the access controlling means, arbitrates memory access between a number of different entities: the system access bus 407, the pixel logic 416, the display refresh logic 426, and the hardware cursor 428. Priority between these entities can vary according to system activity and the degree to which various buffers are full or empty. The priority scheme takes into account whether a particular access relates to a "mission-critical" function, so as to prevent such functions from being disrupted. For example, display refresh can be classified as a mission-critical function.

The exemplary FIG. 3 system allocates a portion of the graphics controller's memory to the CPU for system use such that a single shared memory can be used to concurrently implement display functions and system memory functions. In accordance with alternate embodiments of the present invention, latency times for both graphics and system cycles can be further improved by providing separate queues for graphics and system accesses, with the separate queues being serviced in parallel, independently of each other.

More particularly, FIG. 5 shows the reallocating means 500 represented by the bus interface 402 of FIG. 4 in greater detail. As illustrated in FIG. 5, a bus state machine 502 connects to the CPU bus and executes bus cycles involving the graphics controller. Commands or data from the CPU are latched in a command latch 504. The command latch is connected to both a graphics queue 506 and a system queue 508. The graphics queue 506 establishes bi-directional operation using two separate, uni-directional queues: one queue that stores commands from the CPU and outputs them from the bus interface for use by the graphics controller, and one queue that stores data of the graphics controller and outputs it to the CPU. Likewise, the system queue 508 is a bi-directional queue composed of two unidirectional queues. The output buses of the graphics queue and the system queue are therefore bi-directional and are connected to an output latch 510 in order to drive data from the graphics controller to the CPU.

Separate memory and input/output (I/O) address ranges are defined for each queue such that the graphics and system queues are independently accessible. The graphics queue 506 and the system queue 508 are controlled by a graphics queue state machine 512 and a system queue state machine 514, respectively. These state machines are in turn controlled by the bus state machine 502.

A bus status/configuration registers/address decode block 600 is connected to the bus state machine 502. Further, block 600 is connected with an output multiplexer 516 of the output latch, and an output multiplexer ("mux") 518 of the command latch.

Bus status registers of block 600 contain information regarding the state of the graphics controller and the amount of available space in the graphics and system queues. The bus status registers may be read directly through the output mux 516 without putting a read command into either queue. Configuration registers of block 600 are written to from the bus state machine 502 and are used to select modes of operation in addition to those provided in a typical video graphics array (VGA) implementation.

In accordance with exemplary embodiments, programming flexibility can be improved by providing remapping registers which allow the CPU to reallocate the addresses to which the graphics controller responds. Address decoding is programmable, such that the graphics controller responds to a CPU command if the command is to an address within the graphics controller's designated address space.

Outside the bus interface 402 of FIG. 4, the graphics controller assumes that registers and memory are always at fixed addresses. Within the bus interface, address decode logic included in block 600 allows a register/memory location to be reallocated (i.e., remapped) from an original address to a new address more suitable to the CPU. This address decode logic therefore maps the new CPU address back to its original address.

An exemplary sequence would be as follows. The CPU issues a read command of a particular address. The graphics controller's address decode logic included in block 600 determines that the address is within the graphics controller's range, but that the desired register/memory location has been remapped from its original address to a new address more suitable to the CPU. In this case, the address decode logic in block 600 maps the CPU address back to the original address and latches that address into the appropriate queue via the mux 518. Below the queues 506 and 508, registers and memory are always at fixed addresses, simplifying decoding of the graphics and system queue buses. In addition to the graphics queue 506 and the system queue 508, a separate latch (one-stage queue) 522 can be provided for the hardware cursor.

Referring to FIG. 6, the bus status/configuration registers/address decode block 600 of FIG. 5 is illustrated in greater detail. As shown in FIG. 6, the block 600 includes address decode logic 602, configuration registers 604 and status registers 606. The address decode logic 602 examines the CPU control lines that define whether the command is to memory or I/O and is a read or a write operation. The address decode logic 602 further compares the CPU address on the address bus to addresses programmed for various logic groups. If a match is found, the appropriate select line is asserted. Separate lines out of the address decode logic signal if the CPU address is within the address space of one of the following exemplary groups: VGA mode I/O, VGA mode frame buffer, Windows mode registers, Windows mode frame buffer, system memory, configuration registers, or the status registers address space (which is within the configuration registers address space). Those skilled in the art will appreciate that this listing is not exhaustive.

The configuration registers 604 are initialized to some pre-determined value at power-on reset. The configuration registers remap some of the address spaces within the graphics controller. This remapping allows software to access a particular register or logic at a different address than to which it was initialized. Additional capability can be added to inhibit the graphics controller from responding to accesses of particular logic or memory. This may be done in any number of ways. For example, it can be achieved both explicitly via enable/disable bits in a register and implicitly by programming the low and high address boundaries for a group to be the same. The configuration registers can be read by the CPU via a port 608.

The status registers 606 are read only. They contain information such as queue status (how full the queues are), what the accelerator is doing, what errors have occurred, and so forth. Certain bits of the status registers may be cleared by being read. The CPU reads the status registers directly without having to go through the graphics or system queues.

FIG. 7 illustrates an alternate embodiment of the invention whereby addressable locations in the shared storing means 304 are remapped (i.e., reordered in address sequence) to improve performance when the expansion memory means 328 of FIG. 3 is used. Typically, where an integrated memory is included in a system, such as the conventional system of FIG. 2, any add-on memory resident on a separate memory bus is placed into the system such that the original base system memory is allocated first and the add-on memory is allocated last (i.e., the add-on memory is only utilized when the base system memory is full). This conventional approach forces a maximum memory conflict since most applications do not require memory which exceeds the available base memory, thereby restricting most memory accesses to the base system memory alone (i.e., the pre-existing system memory). The result is minimum concurrency between operations in the base system memory and the add-on memory (i.e., concurrent accesses to the base memory and the add-on memory only occur once the base memory has become full and information is stored in the additional memory).

The remapping of FIG. 7 ensures that addressable locations of the system memory portion in the shared storing means are reallocated such that addressable locations of expansion memory are added to the bottom of available system memory space. In accordance with an exemplary embodiment of the present invention where the expansion memory 328 of FIG. 3 is included, memory space can be allocated such that when the base system memory of the shared memory means 304 is the only memory available, its addressable locations are allocated at the bottom of the address space where it can be easily detected and used by the operating system of the main system CPU 302. As expansion memory is added (e.g., expansion memory 328 of FIG. 3), this expansion memory is allocated with addressable locations of the address space that are accessed by the main CPU before addressable locations of the pre-existing base system memory (i.e., the base system memory is moved on top of the expansion memory). The operating system of the system controller 316 thus allocates memory from the expansion memory 328 first and uses the base system memory only when the expansion memory has been completely allocated.

As illustrated in FIG. 7, the addressable space 700 of the system CPU 302 (FIG. 3) includes both the shared storing means 304 and the expansion memory means 328. Thus, an address placed on the main CPU bus 314 can be directed to the shared storing means 304 or can be directed to the expansion memory means 328. As further illustrated in FIG. 7, the expansion memory is allocated with addressable locations which can be sequentially accessed by the CPU before addressable locations of the base system memory are accessed. This ensures that the expansion memory means will always be accessed first by the CPU to accommodate system upgrades to high-speed memory.

The graphics controller 400 of FIG. 3 buffers accesses to an addressable portion of the shared storing means 304 (i.e., the base system memory and the graphics memory). In an exemplary embodiment, the graphics controller remaps addressable locations received via the main CPU bus (i.e., the left hand side of FIG. 7) to locations within the shared memory, as illustrated in FIG. 7. Thus, an address "A" on the main CPU bus can be remapped by the graphics controller to a location within the shared storing means 304.

In an exemplary embodiment, an address "A" output by the main CPU can be remapped by the graphics controller using reconfiguration registers described previously. In an exemplary embodiment, the remapped address output by the graphics controller can be obtained by (1) subtracting the highest addressable location of the expansion memory from the address "A" (since the expansion memory is not accessible by the graphics controller in the exemplary FIG. 3 embodiment); and (2) adding the addressable locations of the frame buffer (i.e., graphics memory portion) of the shared memory (since the graphics controller places addressable locations of the shared memory which are allocated to graphics at the bottom of its addressable space in the exemplary FIG. 7 embodiment). Thus, for an expansion memory which includes addressable locations 0 through (sys.base-1), and for a frame buffer which includes addressable locations 0 through (fb.top-1) at the output of the graphics controller, an address "A" output on the main CPU bus can be remapped by the graphics controller to an address [A-sys.base+fb.top].

In accordance with exemplary embodiments, the graphics controller does not respond to system memory accesses to the expansion memory means; rather, the system CPU can access the expansion memory via a separate bus, independently of the graphics controller. Thus, addresses output by the system controller on the main CPU bus need not be remapped.

The allocation of expansion memory in accordance with the FIG. 7 embodiment permits the system CPU to access the expansion memory means in parallel with accesses to the shared storing means by the graphics controller and can significantly improve system performance. For example, addressable locations of the graphics memory of the shared storing means (represented as addressable locations 706 which are accessed by the graphics controller in FIG. 7), can be addressed by the graphics controller during system CPU accesses to the expansion memory 708. Efficient use of maximum possible bandwidth can therefore be achieved by reconfiguring the available address space in accordance with the exemplary FIG. 7 embodiment.

The allocation of addressable locations can be implemented by including means for detecting the size (e.g., number of addressable locations) and/or type (e.g., performance level) of expansion memory 328 (i.e., the number of addressable locations available in the expansion memory), and by assigning these locations addresses which constitute the first addressable locations of the system CPU (e.g., beginning with address O). Those skilled in the art will appreciate that this allocation is by way of example only, and that any desired allocation of the shared data storing means and the expansion system memory can be performed based on any predetermined size and performance criteria input by the user. The memory size and type detection of the expansion memory can be in response to an input by the user via a user interface to the main CPU 302 or the graphics controller 400, or can be detected automatically (e.g., by sensing the number and type of addressable locations using any conventional technique). The first address of the pre-existing base system memory (i.e., "sys.base" in FIG. 7) can be allocated the address which is next in sequence to the highest address of the expansion memory (i.e., sys.exp-1). The highest address of the original base system memory (i.e., "sys.top-1" in FIG. 7) then becomes [sys.top+sys.exp-1]. Of course, those skilled in the art will appreciate that addressable locations of the base system memory and the expansion system memory can be dynamically allocated in response to the detecting means in any desired order.

In accordance with exemplary embodiments, most applications can be run in a completely concurrent mode with main system memory accesses going to the expansion memory first and with graphics (i.e., display) accesses being directed to the graphics memory within the shared storing means 304. Accesses of the expansion memory by the system CPU can be performed via a dedicated bus such that the graphics controller can concurrently access the graphics memory of the shared storing means 304. only aggressive memory-using applications will ever encounter any contention between the system CPU and the graphics controller in the shared memory space of the storing means 304. Thus, overall memory usage patterns will dilute effects of accesses resulting in memory contention.

Those skilled in the art will appreciate that the technique of allocating memory as described with respect to the exemplary FIG. 7 embodiment can apply beyond the scope of the exemplary embodiments discussed herein. For example, this technique of memory allocation can be extended to any arbitrary number of individual expansion memories. Regardless of the number of memories used, each memory is remapped such that main system memory accesses are distributed to multiple memories in a manner which permits maximum concurrency of access among the various memories.

In summary, the present architecture allows system cost to be significantly reduced. Further, by providing a bus interface with separate graphics and system paths, the cost savings described can be achieved with a minimal performance penalty. In a system complete with separate expansion memory, performance at least as good as in conventional memory systems can be obtained. In some cases, the possibility of parallel main memory access to two or more possible memory paths (e.g., to the shared storing means 304 and to the expansion memory 328 of FIG. 3) can result in increased performance by effectively overlapping accesses. Although the invention has been described in terms of a two-bank system (i.e., shared storing means 304 and expansion memory 328) having graphics and main store system memory, those skilled in the art will appreciate that the invention can be extended to any arbitrary number of concurrently operating memory banks.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for processing data comprising:

a system controller;

means for controlling a system display operation independently of the system controller;

means for storing data, said data storing means having a display memory portion and a system memory portion; and means for dynamically controlling access of said system controller and said display controlling means to said display memory portion and said system memory portion via said display controlling means, such that available bandwidth of said data storing means is allocated among accesses by said display controlling means and said system controller.

2. Apparatus according to claim 1, further comprising:

means for programmably allocating said display memory portion and said system memory portion within said data storing means.

3. Apparatus according to claim 2, further comprising:

means for independently accessing said first and second portions of said memory.

4. Method for processing data comprising the steps of:

storing data in a data storing means, the data storing means having a display memory portion with a first addressable location;

reallocating the first addressable location of the data storing means as system memory accessible by a system controller which is independent of a display controlling means that accesses said display memory portion; and dynamically controlling access of the system controller and the display controlling means to the display memory portion and the system memory portion via said display controlling means, such that available bandwidth of the data storing means is allocated among accesses by the display controlling means and the system controller.

5. Apparatus comprising:

a first memory for storing data;

means for programmably allocating a first portion of said first memory as display memory and a second portion of said first memory as system memory;

means for independently accessing said first and second portions of said first memory via a display controlling means;

means for dynamically allocating available bandwidth of said first memory among accesses to said first and second portions of said first memory;

a second memory for storing data, said second memory being accessible via a system controller; and means for remapping said second memory and said second portion of said first memory to a contiguous address space.

6. Apparatus according to claim 5, said second memory further comprising:

addressable locations that are sequentially accessed by the system controller prior to addressable locations of said first memory.

7. Apparatus according to claim 6, further comprising:

means for accessing addressable locations of said second memory via an address bus which is independent of an address bus of said first memory.

8. Apparatus according to claim 7, further comprising:

means for controlling a display operation of the system independently of the system controller, said display controlling means accessing said display memory in parallel with system controller accesses to said second memory.

9. Apparatus for processing data comprising:

a system controller;

means for controlling a system display operation independently of the system controller;

means for storing data, said data storing means having a first range of addressable locations allocated to a display memory portion and a second range of addressable locations allocated to a system memory portion accessible by the system controller via the display controlling means; and means for expanding said system memory portion, said expanding means including means for remapping addresses of said system memory portion such that said expanding means includes addressable locations which are sequentially accessed by the system controller prior to accesses of the system memory portion of the data storing means.

10. Apparatus according to claim 9, further comprising:

means for detecting a number of addressable locations in the expanding means, said remapping means being responsive to said detecting means.

11. Apparatus according to claim 10, wherein said system memory expanding means further comprises:

means for dynamically reordering addressable locations of said data storing means upon detecting a change in a number of addressable locations accessible by said system controller.

12. Apparatus according to claim 11, wherein said means for dynamically reordering further comprises:

means responsive to differences in said system memory expanding means relative to said data storing means for allocating at least a portion of said data storing means as display memory and for allocating said system memory expanding means as system memory.

13. Apparatus according to claim 12, further comprising:

means for providing substantially independent access of said system controller to said data storing means and to said system memory expanding means.

14. A method for processing data comprising the steps of:

controlling a display operation of a data processing system independently of system control by a system controller;

storing data in a memory, the memory having a first range of addressable locations allocated to a display memory portion and a second range of addressable locations allocated to a system memory portion accessible by the system controller via a display controller; and expanding the system memory by remapping addresses of the system memory such that addressable locations of an expanded system memory are sequentially accessed by the system controller prior to accesses of the system memory portion of the memory via a display controller.

15. Method according to claim 14, further comprising the step of:

detecting a number of addressable locations in the expanded system memory, and remapping the system memory in response to said step of detecting.

* * * * *